(12) United States Patent
Li

(10) Patent No.: US 9,684,186 B1
(45) Date of Patent: Jun. 20, 2017

(54) GLASSES WITH CHANGEABLE LENS

(71) Applicant: SUN SIGHT GLASSES CO., LTD., Tainan (TW)

(72) Inventor: Jui-Chi Li, Tainan (TW)

(73) Assignee: Sun Sight Glasses Co., Ltd., Tainan (TW)

( * ) Notice: Subject to any disclaimer, the term of this patent is extended or adjusted under 35 U.S.C. 154(b) by 0 days.

(21) Appl. No.: 15/191,929

(22) Filed: Jun. 24, 2016

(51) Int. Cl.
*G02C 1/08* (2006.01)
*G02C 5/04* (2006.01)

(52) U.S. Cl.
CPC .......... *G02C 5/04* (2013.01); *G02C 2200/02* (2013.01); *G02C 2200/08* (2013.01)

(58) Field of Classification Search
CPC .............................. G02C 1/08; G02C 2200/06
USPC .. 351/92, 90, 98, 97, 86, 83, 106, 103, 124, 351/93, 94, 95, 128, 129
See application file for complete search history.

(56) References Cited

U.S. PATENT DOCUMENTS

| 3,758,203 | A | * | 9/1973 | Lipchik | ................... G02C 5/02 351/130 |
| 5,098,180 | A | * | 3/1992 | Tobey | ..................... G02C 1/08 351/85 |
| 8,992,007 | B2 | * | 3/2015 | Li | ......................... G02C 7/086 351/124 |

FOREIGN PATENT DOCUMENTS

TW      M455172 U1      1/2013

* cited by examiner

*Primary Examiner* — Hung Dang
(74) *Attorney, Agent, or Firm* — Rosenberg, Klein & Lee

(57) ABSTRACT

A pair of glasses with changeable lenses is revealed. A right frame and a left frame are communicated by a channel disposed on a bridge of an eyeglass frame. The eyeglass frame is divided into an upper part and a lower part by the channel, each of which is arranged with a magnetic part. The lenses are positioned by the magnetic parts attracted each other to close the channel. Or the two magnetic parts are pulled and separated to open the channel so that the lenses are able to be replaced. Therefore the lenses can be disassembled and assembled easily.

2 Claims, 6 Drawing Sheets

GLASSES WITH CHANGEABLE LENS

BACKGROUND OF THE INVENTION

Fields of the Invention

The present invention relates to a pair of glasses, especially to a pair of glasses with changeable lenses based on the principle of magnetism. The glasses with changeable lenses feature on good limiter and easy operation.

Descriptions of Related Art

Generally, eyewear available on the market is divided into various types such as sunglasses, optical glasses, sports glasses, safety glasses, etc. according to their functions. Or the eyewear is divided into a full frame type and a frameless type according to the frame it includes. Consumers select the eyewear according to personal interests and needs.

Holes for mounting lenses are located on two ends of an eyeglass frame. A threaded end being threaded and fixed by thread-like components is formed on an outer side of the holes for mounting lenses. After being cut and polished, the lens is mounted into the hole and fixed by the thread-like components threaded into the threaded end. Thus the lens is positioned in the hole firmly without falling off. However, it takes time and tools to thread the thread-like components into the threaded end. Once there is no tool available, the thread-like components can't be set up. This causes inconvenience to users during assembly processes.

In order to solve the problem mentioned above, an eyeglass assembly in Taiwanese Pat. Pub. No. M455172U1 is revealed. The eyeglass assembly mainly includes an eyeglass frame, positioning blocks and lenses. A lens-assembly hole is arranged at each of two sides of the eyeglass frame and is corresponding to the lens. A mounting channel is formed on an inner edge of the lens-assembly hole while a recessed mounting portion is set on each side of the eyeglass frame, corresponding to an outer edge of the lens-assembly hole. The positioning block is mounted into the recessed mounting portion on each side of the eyeglass frame. Thus the positioning block and the recessed mounting portion are pivotally connected. A fastening part is disposed on an edge on an upper end of the positioning block and corresponding to an upper end of the recessed mounting portion. Thus the positioning block locked into the recessed mounting portion is connected to and fixed in the eyeglass frame firmly by the fastening part. The lens is mounted and fixed in the mounting channel of the lens-assembly hole and then is pressed and positioned by the positioning block.

Although the above structure overcomes shortcomings of conventional design, there is room for improvement and a need to provide a novel structure of glasses with changeable lenses.

SUMMARY OF THE INVENTION

Therefore it is a primary object of the present invention to provide a pair of glasses with changeable lenses based on the principle of magnetism. The glasses with changeable lenses feature on good limiting and easy operation.

In order to achieve the above object, a pair of glasses with changeable lenses of the present invention includes a channel disposed on a bridge of an eyeglass frame. The channel communicates with a left frame and a right frame. The eyeglass frame is divided into an upper part and a lower part by the channel. The upper part and the lower part are disposed with a magnetic part respectively. By the attracted magnetic parts that close the channel, the lenses are positioned. Or the two magnetic parts are pulled and separated to open the channel so that the lenses can be replaced. Thereby the lenses are disassembled and assembled easily and conveniently.

The upper part includes an upper chamber used for receiving a first magnetic part correspondingly. At least one first mounting hole is arranged in the upper chamber while at least one first pin is disposed on the first magnetic part. The at least one first pin is mounted into the at least one first mounting hole correspondingly.

Similarly, the lower part includes a lower chamber used for receiving a second magnetic part. The lower chamber is set with at least one second mounting hole and the second magnetic part is arranged with at least one second pin. The at least one second pin is inserted into the at least one second mounting hole correspondingly.

A protruding piece is set on the upper chamber and a slot is formed between the protruding piece and the first magnetic part. Hooks are set on a surface of the lower part and passed through the slot of the upper part to be located in the upper chamber and limited by the protruding piece.

A protrusion is disposed on a surface of the upper part of the eyeglass frame while a recess is mounted on a surface of the lower part. The upper and the lower parts are connected to each other more securely by the protrusion being mounted into the recess.

Compared with the structure available now, the present invention has the following advantages:

1. The glasses with changeable lenses of the present invention are disassembled and assembled conveniently based on the principle of magnetism.

2. The magnetic parts are secured firmly by the pin being mounted into the mounting hole correspondingly.

3. The opening size of the channel is limited by the hooks worked together with the protruding piece. Thus the lenses will not fall off in case of a crash.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
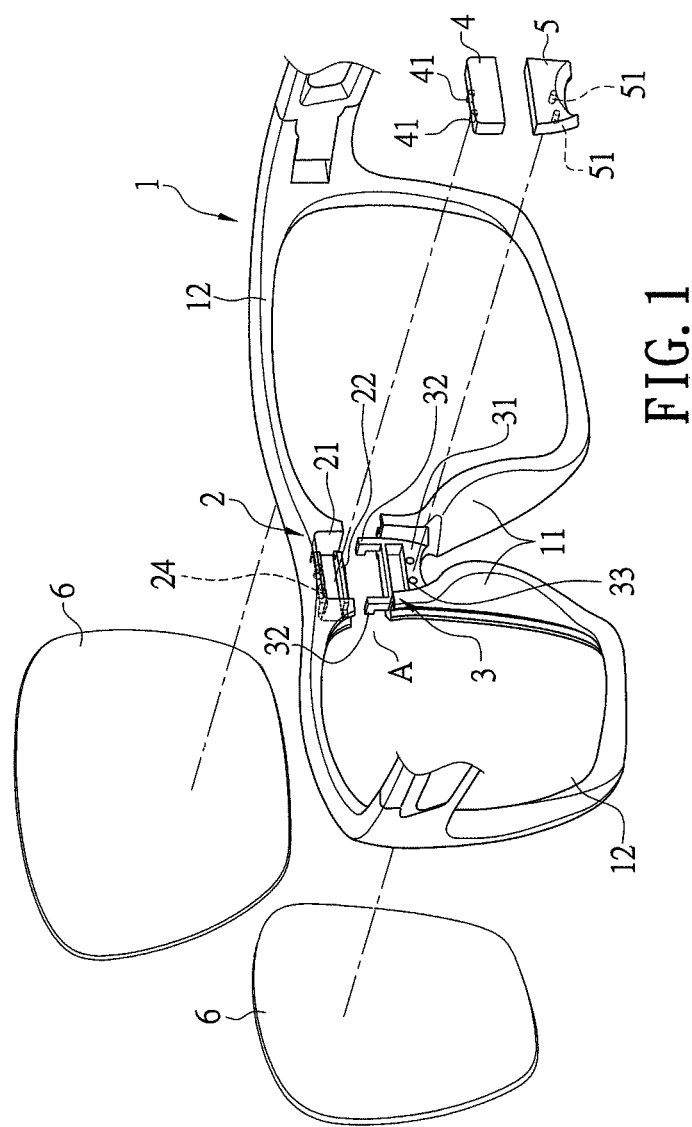
FIG. 1 is an explosive view of an embodiment according to the present invention.
Figure 2:
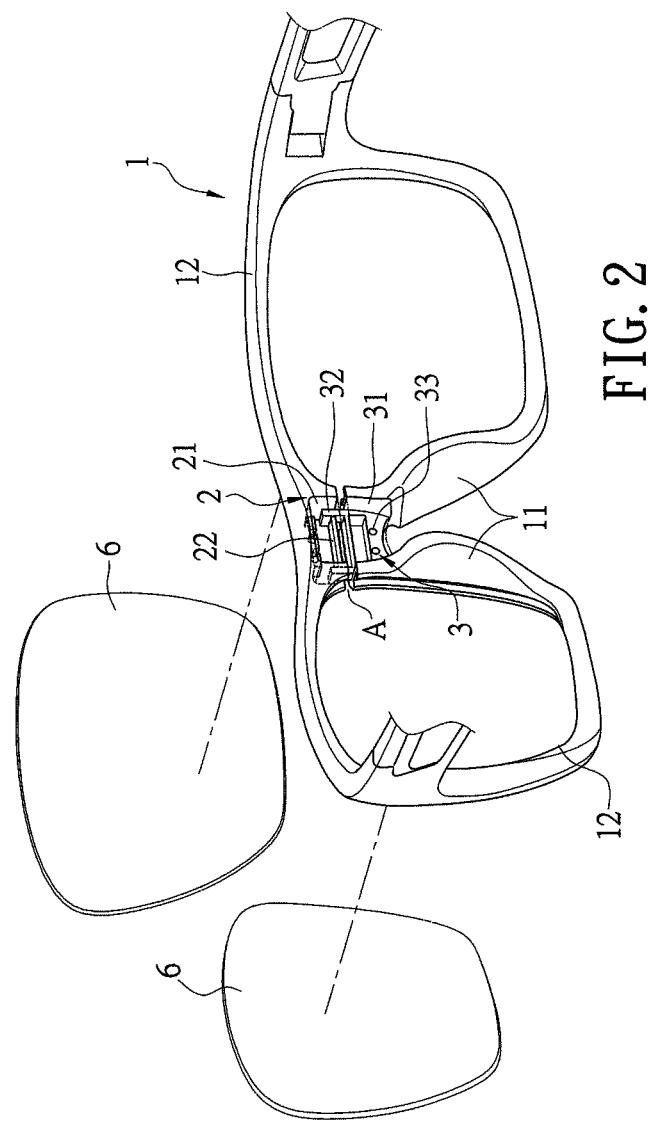
FIG. 2 is a schematic drawing showing a partial assembly of hooks in an upper chamber of an embodiment according to the present invention.

Refer to FIG. 1 and FIG. 2, a pair of glasses with changeable lenses of the present invention mainly includes a channel A disposed on a bridge 11 of an eyeglass frame 1. The channel A communicates with a left frame and a right frame 12. The eyeglass frame 1 is divided into an upper part 2 and a lower part 3 by the channel A.

The upper part 2 includes an upper chamber 21 used for receiving a first magnetic part 4 correspondingly. A protruding piece 22 is set on the upper chamber 21 and a slot 23 is formed between the protruding piece 22 and the first magnetic part 4.

The lower part 3 includes a lower chamber 31 used for receiving a second magnetic part 5. The second magnetic part 5 and the first magnetic part 4 are attached to or separated from each other. Hooks 32 are set on a surface of the lower part 3. The hooks 32 are passed through the slot 23 of the upper part 2 to be located in the upper chamber 21 and limited by the protruding piece 22.

While being assembled, as shown from FIG. 1 to FIG. 4, the first magnetic part 4 and the second magnetic part 5 are mounted into the upper chamber 21 of the upper part 2 and the lower chamber 31 of the lower part 3 on the bridge 11 of the eyeglass frame 1 respectively. At least one first mounting hole 24 is arranged in the upper chamber 21 while at least one first pin 41 is disposed on the first magnetic part 4. The at least one first pin 41 is mounted into the at least one first mounting hole 24 correspondingly. Similarly, the lower chamber 31 is set with at least one second mounting hole 33 and the second magnetic part 5 is arranged with at least one second pin 51. The at least one second pin 51 is inserted into the at least one second mounting hole 33 correspondingly. Thereby the magnetic parts 4, 5 are fixed in the chambers 21, 31 respectively.

Figure 3:
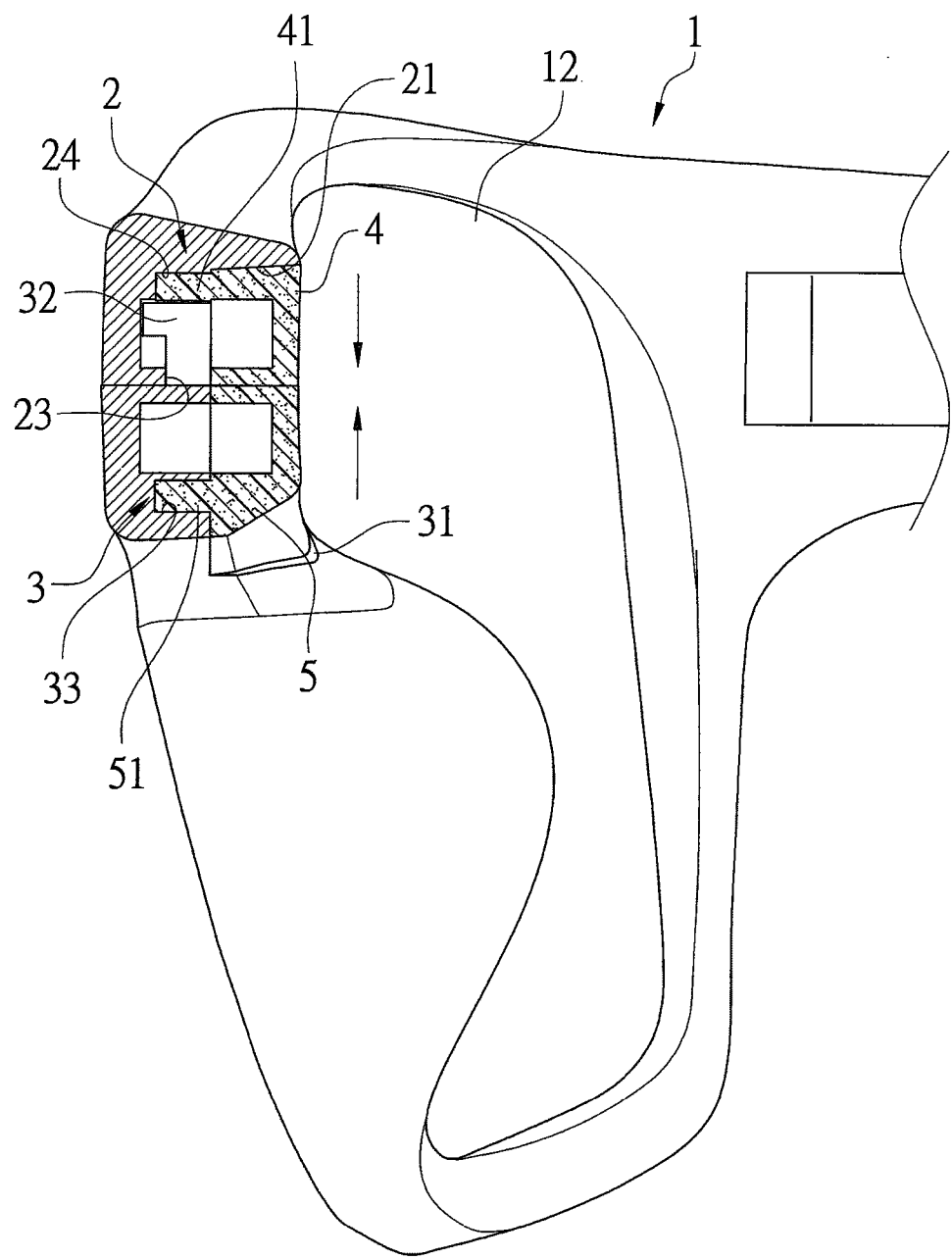
FIG. 3 is a longitudinal cross sectional view of a closed channel of an embodiment according to the present invention.

Before assembly of the first magnetic part 4 and the second magnetic part 5, the hooks 32 of the lower part 3 are located in the upper chamber 21. After completing the assembly of the first magnetic part 4 with the second magnetic part 5, the hooks 32 are located in the slot 23 between the protruding piece 22 and the first magnetic part 4. When lenses 6 are mounted in the eyeglass frame 1, the first magnetic part 4 and the second magnetic part 5 are attached to each other and mounted closely in the channel A of the bridge 11 so that the lenses 6 are firmly positioned within the left frame and the right frame 12, as shown in FIG. 3.

Figure 4:
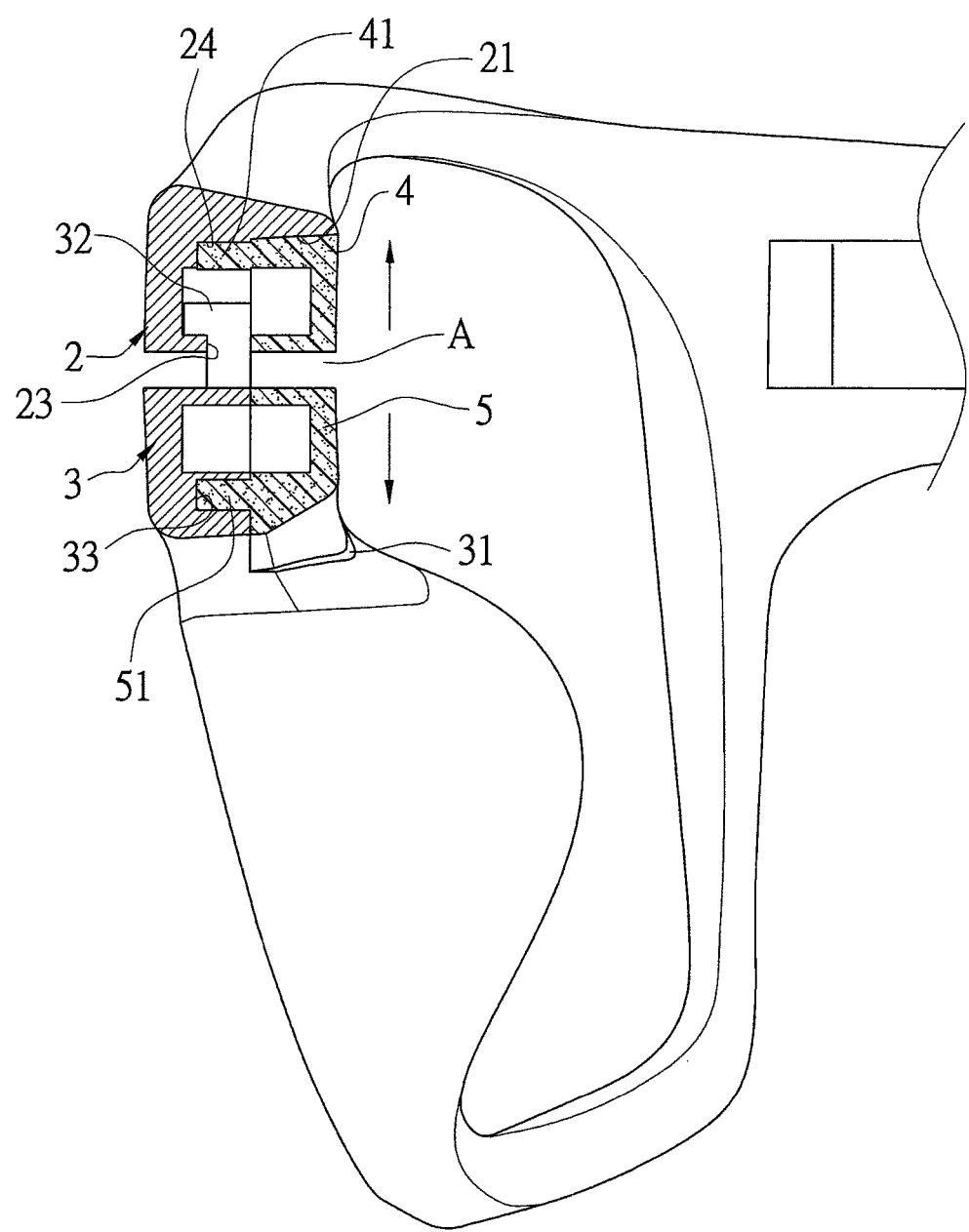
FIG. 4 is a longitudinal cross sectional view of an exposed channel of an embodiment according to the present invention.

When users intend to change the lenses 6, the first and the second magnetic parts 4, 5 are pulled and separated so that the channel A is exposed, as shown in FIG. 4. The opening size of the channel A is defined by the distance between the hooks 32 in the upper chamber 21 and the protruding piece 22 so that the channel A will not be opened too much. Thus the lenses 6 can be replaced by new ones. Moreover, the opening size of the channel A is determined according to the position of the hooks 32 relative to the protruding piece 22. Thus the lenses 6 will not fall off in case of a collision. The lenses 6 are positioned by the channel A closed by the first and the second magnetic parts 4, 5 attached to each other while the lenses 6 are able to be replaced by the communicating channel A formed owing to the second magnetic parts 4, 5 pulled and separated. Therefore the lenses 6 are disassembled and assembled easily and conveniently.

Figure 5:
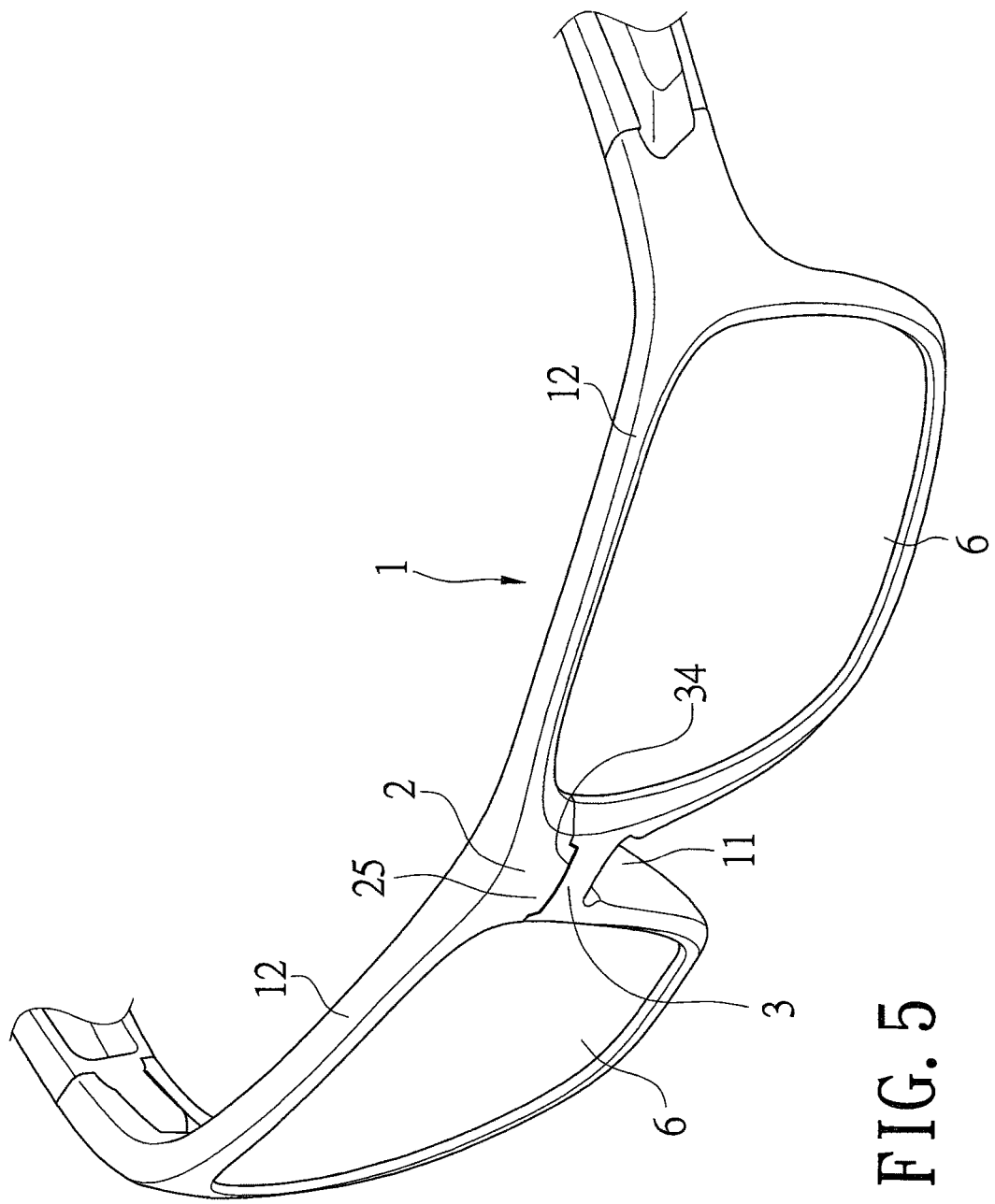
FIG. 5 is a perspective view of another embodiment according to the present invention.
Figure 6:
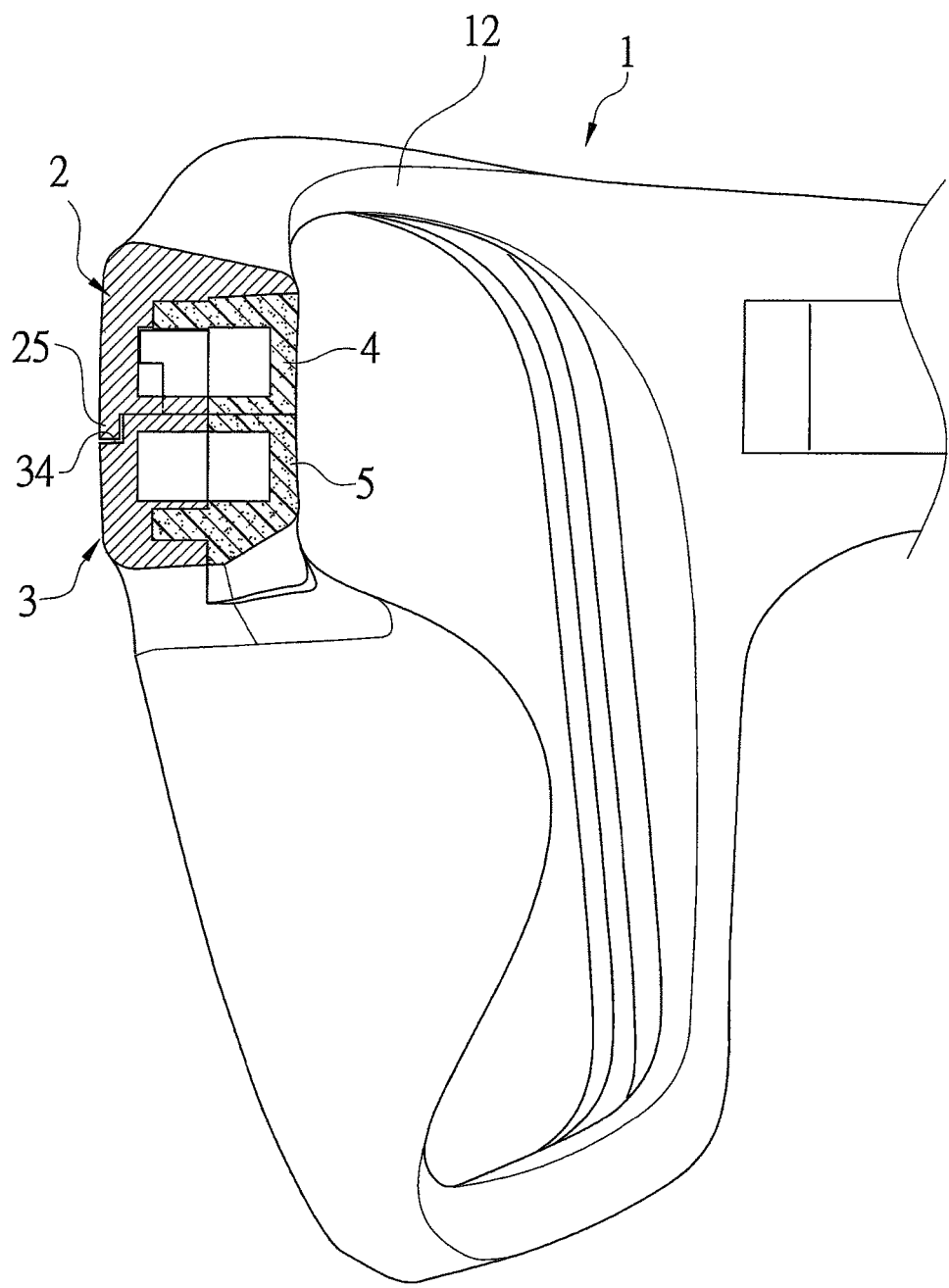
FIG. 6 is a longitudinal cross sectional view of another embodiment according to the present invention.

Refer to FIG. 5 and FIG. 6, a protrusion 25 is disposed on a surface of the upper part 2 of the eyeglass frame 1 while a recess 34 is mounted on a surface of the lower part 3 in order to make the upper part 2 and the lower part 3 of the eyeglass frame 1 fit with each other more closely. By the protrusion 25 being pressed into the recess 34, the upper and the lower parts 2, 3 are connected to each other more tightly.

In summary, the present invention has the following advantages compared with the structure available now:

1. The glasses with changeable lenses of the present invention are disassembled and assembled conveniently based on the principle of magnetism.

2. In the glasses with changeable lenses of the present invention, the magnetic parts are fixed firmly by the pin being mounted into the mounting hole correspondingly.

3. The opening size of the channel is determined and limited by the position of the hooks relative to the protruding piece. Thus the lenses will not fall off in case of a crash.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pair of glasses with changeable lenses comprising a channel communicating with a left frame and a right frame, and being disposed on a bridge of an eyeglass frame; the eyeglass frame having an upper part and a lower part being divided by the channel; wherein the upper part includes an upper chamber used for receiving a first magnetic part correspondingly; at least one first mounting hole is arranged in the upper chamber while at least one first pin is disposed on the first magnetic part; the at least one first pin is mounted into the at least one first mounting hole correspondingly; a protruding piece is set on the upper chamber and a slot is formed between the protruding piece and the first magnetic part; wherein the lower part includes a lower chamber used for receiving a second magnetic part; the lower chamber is set with at least one second mounting hole and the second magnetic part is arranged with at least one second pin; the at least one second pin is inserted into the at least one second mounting hole correspondingly; hooks are set on a surface of the lower part; the hooks are passed through the slot of the upper part to be located in the upper chamber and limited by the protruding piece.

2. The device as claimed in claim 1, wherein a protrusion is disposed on a surface of the upper part of the eyeglass frame while a recess is mounted on a surface of the lower part; the protrusion and the recess are mounted to each other.

\* \* \* \* \*